(12) United States Patent
Ball, IV

(10) Patent No.: US 10,981,088 B2
(45) Date of Patent: Apr. 20, 2021

(54) SAND COLLECTION AND CONCENTRATION TANK

(71) Applicant: KBK Industries, LLC, Rush Center, KS (US)

(72) Inventor: Will Dexter Ball, IV, Bixby, OK (US)

(73) Assignee: KBK Industries, LLC, Rush Center, KS (US)

( * ) Notice: Subject to any disclaimer, the term of this patent is extended or adjusted under 35 U.S.C. 154(b) by 0 days.

(21) Appl. No.: 16/580,712

(22) Filed: Sep. 24, 2019

(65) Prior Publication Data

US 2021/0086107 A1    Mar. 25, 2021

(51) Int. Cl.
*B01D 21/26*    (2006.01)
*B01D 21/24*    (2006.01)
*B01D 21/02*    (2006.01)

(52) U.S. Cl.
CPC .......... *B01D 21/265* (2013.01); *B01D 21/10* (2013.01); *B01D 21/245* (2013.01); *B01D 21/2416* (2013.01); *B01D 21/2444* (2013.01); *B01D 21/02* (2013.01)

(58) Field of Classification Search
CPC .... B01D 21/265; B01D 21/245; B01D 21/10; B01D 21/2416; B01D 21/2444; B01D 21/02
USPC ..................................................... 210/512.1
See application file for complete search history.

(56) References Cited

U.S. PATENT DOCUMENTS

| | | | | |
|---|---|---|---|---|
| 1,995,559 A | * | 3/1935 | Andrews | B01D 21/2472 210/768 |
| 2,101,908 A | * | 12/1937 | Joos | C02F 1/5281 210/737 |
| 3,036,715 A | * | 5/1962 | Gould | B01D 21/06 210/520 |
| 4,120,795 A | * | 10/1978 | Laval, Jr. | B01D 17/0217 209/729 |
| 5,073,266 A | * | 12/1991 | Ball, IV | B01D 17/0217 210/519 |
| 5,711,374 A | | 1/1998 | Kjos | |
| 6,228,148 B1 | | 5/2001 | Aaltonen et al. | |
| 6,250,473 B1 | | 6/2001 | Golightley et al. | |

(Continued)

FOREIGN PATENT DOCUMENTS

SU    1655536 A1 *  6/1991    ............. B01D 17/04

OTHER PUBLICATIONS

U.S. Appl. No. 16/253,973, Ball IV, filed Jan. 22, 2019.

*Primary Examiner* — Nam X Nguyen
*Assistant Examiner* — Ekandra S. Miller-Cruz
(74) *Attorney, Agent, or Firm* — Leydig, Voit & Mayer, Ltd.

(57) ABSTRACT

A collection and concentration system including a separation tank having a plurality of distribution arms configured to separate and recover oil, water, and sediment or sand from an inflowing mixture of the same. The distribution arms are connected to and in fluid communication with a downcomer section of a center column that is vertically arranged in the separation tank. The distribution arms extend radially toward a sidewall of the tank and include tangential discharge nozzles that are tangentially directed toward the sidewall. Inflowing mixture directed tangentially against the sidewall is directed in a downward, helical manner that assists in the separation and recovery of oil, water, and sediment from the inflowing mixture.

20 Claims, 2 Drawing Sheets

(56) References Cited

U.S. PATENT DOCUMENTS

| | | | |
|---|---|---|---|
| 6,966,987 B1 * | 11/2005 | Morgan, Jr. | B01D 21/02 |
| | | | 210/279 |
| 7,374,668 B1 | 5/2008 | DiValentin et al. | |
| 8,141,718 B2 * | 3/2012 | Biester | B01D 21/10 |
| | | | 210/512.1 |
| 8,226,820 B1 | 7/2012 | Wegner | |
| 8,257,588 B2 | 9/2012 | Mori et al. | |
| 9,630,126 B1 * | 4/2017 | Ball | B01D 17/0214 |
| 9,765,265 B2 * | 9/2017 | Ball, IV | B01D 21/2494 |
| 2010/0269696 A1 | 10/2010 | Sarshar et al. | |
| 2012/0006762 A1 * | 1/2012 | McCabe | B01D 17/0211 |
| | | | 210/801 |
| 2012/0152864 A1 * | 6/2012 | Sowerby | B01D 21/10 |
| | | | 210/803 |
| 2013/0083620 A1 | 4/2013 | Hypes et al. | |
| 2014/0275690 A1 | 9/2014 | Hernandez et al. | |
| 2015/0101962 A1 * | 4/2015 | Garner | C10G 1/045 |
| | | | 208/390 |

\* cited by examiner

SAND COLLECTION AND CONCENTRATION TANK

FIELD OF THE DISCLOSURE

The disclosure relates to separation tanks and, more particularly, to a tank for separating sand and sediment from a mixture of water and oil.

BACKGROUND OF THE INVENTION

Fluid streams from oil production fields often contain a variety of components, including sand and silt from fracturing operations, drilling fines, formation fines, water, oil, and gases. It is desirable to remove the sand and gases from the liquid stream prior to separating the oil from the water. The separation and removal of sand and other solids and associated gases promotes more efficient oil-water separation in downstream processes, adding to oil volumes and minimizing water pollution. The separation of solids from the oil and water mixture is typically done in so-called desanding tanks, which allow sand and other solids to settle while liquid components such as oil and water flow out of the tank.

Typical desanding tanks use gravity to settle solids from the oil and water liquids that are recovered from the ground. The efficiency and speed of separation is important in that it dictates the quality and speed of separation of oil and water generally in an oil production operation.

BRIEF SUMMARY OF THE INVENTION

In an aspect, the disclosure provides a collection and concentration system including a separation tank having a plurality of tangential distribution arms in fluid communication with a central column vertically disposed within the separation tank. The distribution arms are directed outwards towards the tank sidewall and may be arranged to direct fluid tangentially against the sidewall such that a centrifugal or helical direction is imparted to the fluid flow inside the tank interior. Gases, oil, liquids, and sand or sediments may separate from the inflowing mixture and accumulates in vertical separation regions within the tank interior. A lower section of the central column may be in fluid communication with an outlet pipe for directing recovered fluids from the separation tank. In addition, to collect recovered oil, the separation tank may include an oil spillover bucket disposed within an oil region of the tank interior where oil accumulates.

A possible advantage of the disclosure is that the separation tank and distribution arms therein are configured to impart a helical flow direction to the incoming mixtures that facilitates increased separation of the mixture into constituent components. Another possible advantage is that the separated constituents may accumulate in different regions of the tank interior to facilitate their more predicable removal from the separation tank. These and other possible advantages and features of the disclosure will be apparent from the following detailed description and drawings.

DETAILED DESCRIPTION OF THE INVENTION

Figure 1:
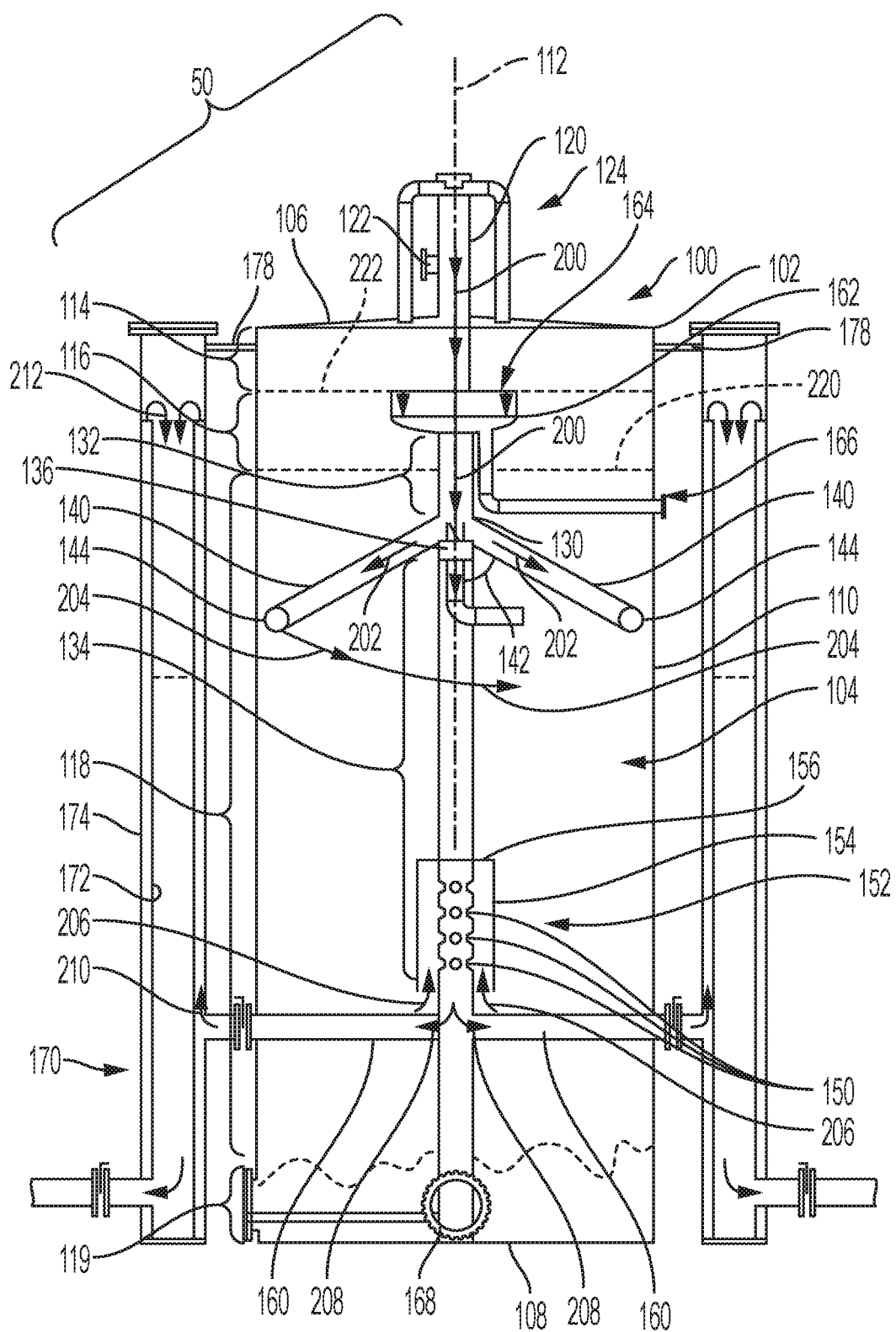
FIG. 1 is a side elevational view of a collection and concentration system including a sectional view of the tank interior of a separation tank showing the components therein according to an embodiment of the disclosure.

Referring now to FIG. 1, there is illustrated a collection and concentration system 50 which includes a separation tank 100 in accordance with the disclosure. The separation tank 100 includes a tank shell 102 that defines a tank interior 104. The tank shell 102 has top portion or top lid 106, a bottom portion 108, and a tank sidewall 110 that enclose the tank interior 104. The tank sidewall 110 may be cylindrical and may be disposed around and define a central axis 112 that extends between the top lid 106 and bottom portion 108; however, in other embodiments, the tank sidewall may have other shapes such as octagonal. In the illustrated embodiment, the separation tank 100 can be oriented vertically so that the central axis 112 is arranged in the vertical direction. In operation, the separation tank 100 functions to separate by gravity the flow of an incoming mixture into constituents, which may be accommodated in various regions of the tank interior 104. For example, in an embodiment, the tank interior 104 may be arranged in an axially upward gas region 114 proximate the top lid 106, an oil region 116 disposed axially below the gas region 114, a liquid region 118 disposed axially below the oil region 116, and an axially bottommost sediment region 119 proximate the bottom portion 108 of the tank shell 102. In other embodiments, including those intended for use with incoming mixtures of different constituents, different or additional separation regions are contemplated.

To receive the flow of incoming mixture, the separation tank 100 can include an inlet 120 for gas and liquid separation disposed above the top lid 106, which may be in the configuration of an inlet orifice 122 and associated piping. The inflowing mixture may be a fluid or aqueous solution from an oil production field, although aspects of the disclosure may be applicable to other technologies and recovery processes. In an embodiment, to remove at least a portion of the gases entrained or dissolved in the inflowing mixture, the inlet 120 may be in operative association with a degassing boot equalizer 124. The degassing boot equalizer 124 may redirect or agitate the flow of the incoming mixture so that entrained gases are discharged, although in other embodiments, the degassing boot may operate on pressure differential and/or gravity separation principles as well. The degassing boot equalizer 124 may also equalize gas pressure between various components of the collection and concentration system 50.

The inlet 120 can be in fluid communication with a center column 130, which can be a large diameter pipe centrally disposed in the tank interior 104 and vertically aligned along the central axis 112. The center column 130 can extend from proximate the bottom portion 108 of the tank shell 102 to vertically protrude through the top lid 106 exteriorly of the tank shell to communicate with the inlet 120. The center column 130 can be separated into two vertical sections including a vertically upward downcomer section 132 and a vertically downward lower section 134. The downcomer section 132 and the lower section 134 can be separated by a blanking plate 136, also referred to as a sealed baffle, that is disposed inside the center column 130. The blanking plate 136 may be a horizontal plate or corresponding structure that blocks or prevents fluid within the center column 130 from flowing between the downcomer section 132 and the lower section 134. The blanking plate 136, and therefore the separation between the downcomer section 132 and the lower section 134, may be axially located at any suitable location with respect to the central axis 112, although in the illustrated embodiment the blanking plate may be disposed toward the top of the lower section 134 below the downcomer section 132. The inlet 120 can be connected to the center column 130 at a right angle above the top lid 106 so that incoming mixture are redirected axially downward into degassing boot equalizer 124 and into the downcomer section 132 from the degassing boot equalizer 124.

To redirect the downward axial flow of the inflowing mixture radially outward with respect to the central axis 112, the downcomer section 132 can be operatively connected to and in fluid communication with a plurality of distribution arms 140. The distribution arms 140 can be smaller in diameter than the center column 130 and may connect to the downcomer section 132 proximate to or just above the axial location of the blanking plate 136, which forcibly redirects the flow of liquids and solids into the distribution arms. The distribution arms 140 can extend radially outward toward the tank sidewall 110. The distribution arms 140 can be configured as elongated, enclosed pipes or tubular channels to maintain the inflowing mixture therein separately from the tank interior 104. To further promote separation of entrained constituents from the inflowing mixture, the distribution arms 140 may be angled or sloped axially downward as they extend from the center column 130, for example, at a downward angle 142, which may be approximately 60° with respect to the central axis 112. Arranging the distribution arms 140 on the downward angle 142 increases the effective length of the distribution arms between the center column 130 and the tank sidewall 110 and increases the time in which the flow is contained therein. In an embodiment, the separation tank 100 may include four distribution arms 140, although any suitable number of distribution arms may be utilized.

Figure 2:
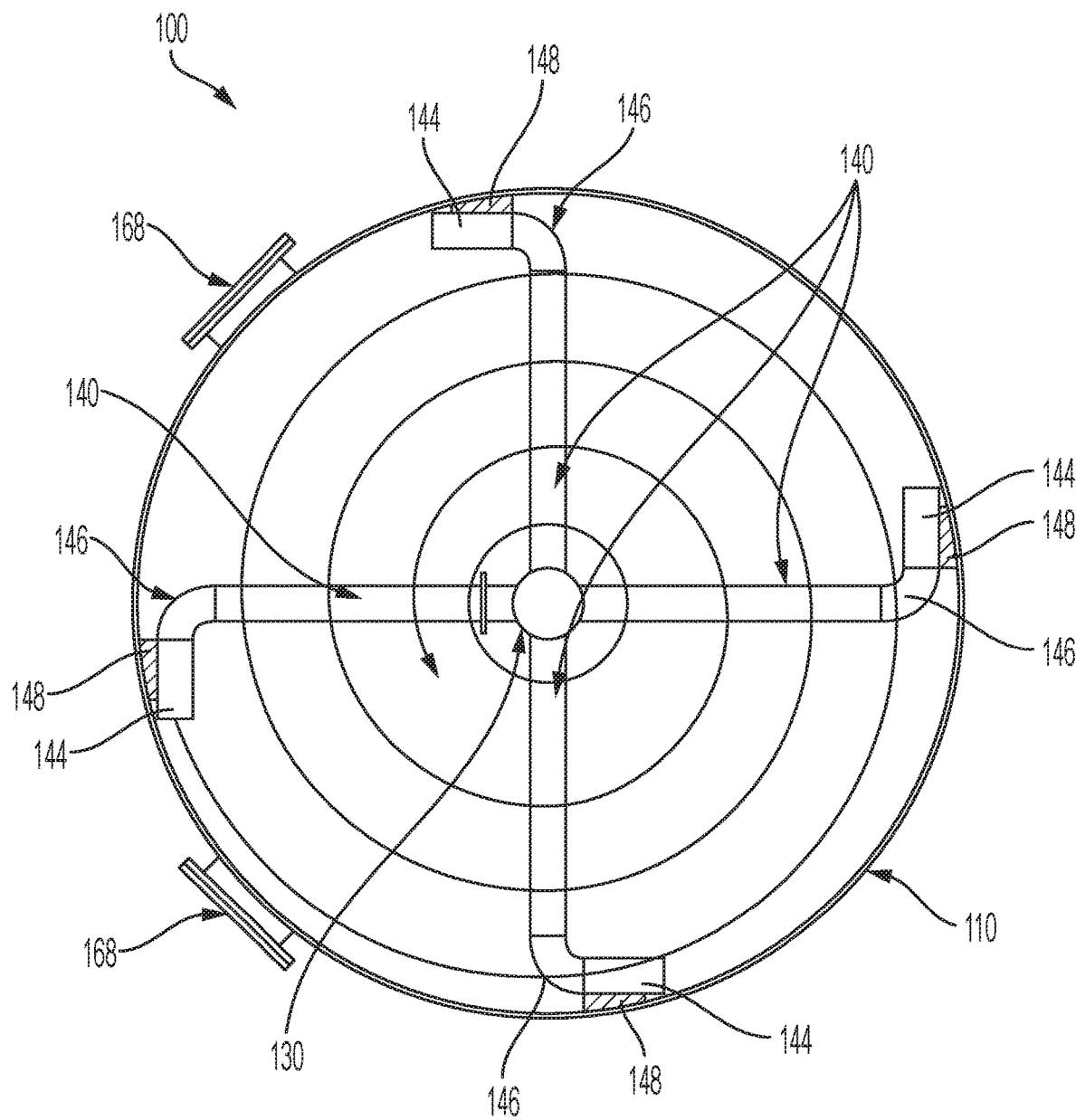
FIG. 2 is a top plan view into the tank interior of the separation tank of FIG. 1 showing the arrangement of the components therein including the distribution arms.

To impart a circumferential or helical direction to the flow, each of the plurality of distribution arms 140 can include a tangential discharge nozzle 144 disposed at the distal end thereof where the discharge arm terminates proximate the tank sidewall 110. Referring to FIG. 2, each of the distribution arms 140 may include an elbow 146 that couples the distribution arm to the tangential discharge nozzle 144 proximately adjacent to and circumferentially aligned tangent with the tank sidewall 110. The elbow 146 may be a right angled pipe that redirects flow in the distribution arm 140 from the radially outward direction to a circumferential direction associated with the discharge nozzle 144 so that the flow is tangentially oriented toward and possibly parallel with the tank sidewall 110. Accordingly, as flow is discharged from the distribution arm 140 against the tank sidewall 110, the orientation and arrangement of the components imparts a circumferential direction to the discharged flow along the interior of the tank sidewall 110. Moreover, because the distribution arms 140 are sloped downward by the downward angle 142, the discharged flow may have an axially downward component towards the bottom portion 108 of the tank shell 102. The effect of the cylindrical or similar shape of the tank sidewall 110 and the downward angle 142 of the tangential discharge nozzles 144 is to direct the flow in a downward spiral or helix within the tank interior 104. In an embodiment, the helical flow may be circulating in the counter-clockwise direction. In an embodiment, to fix the orientation of the distribution arms 140 within the tank interior 104, the discharge nozzles 144 may be secured to the tank sidewall 110 by nozzle tabs 148, which may be made from fiberglass epoxy. As explained in more detail below, the helical flow direction further separates the inflowing mixture into the constituent components of oil, water, emulsion, and sedimentation.

To remove recovered fluid, which may be aqueous clarified water, from tank interior 104 of the separation tank 100, the lower section 134 of the center column 130 can have a plurality of orifices 150 disposed at an axially lower region thereof so that fluid can be received again into the center column. To collect and direct fluid to the orifices 150, an up-flow shroud 152 can be coaxially disposed around the lower section 134 generally coextensive with the orifices 150. The up-flow shroud 152 can be a shell or jacket 154, cylindrical or similar in shape, that is vertically oriented and larger in diameter than the lower section 134 so that jacket 154 is radially spaced from the lower section. The jacket 154 is opened at its lower end and is closed at its upper end by a horizontal connection plate 156 that secures the up-flow shroud 152 to the lower section 134 of the center column 130 above the orifices 150. Hence, the connection plate 156 may be generally annular in shape including an inner diameter corresponding to the lower section 134 and an outer diameter corresponding to the jacket 154. The helically swirling fluid from the discharge arms 140 can flow underneath the lower edge of the jacket 154 and can be redirected upwards into the annular gap between the up-flow shroud 152 and the lower section 134 where the fluid can be received into the center column 130 via the orifices 150.

To continue the removal of fluid from the separation tank 100, the lower section 134 of the center column 130 can be in fluid communication with one or more outlet pipes 160 that extend radially outward from the center column and are disposed through the tank sidewall 110 of the tank shell 102. The outlet pipes 160 can be located axially above the bottom portion 108 of the separation tank 100 and can be connected to the lower section 134 axially below the plurality of orifices 150. The outlet pipes 160 thereby establish fluid communication between the tank interior 104 and the exterior of the separation tank 100 via a flow path between center column 130 and the interior of the jacket 154 through the orifices 150. The outlet pipes 160 may be similar in size and capacity to the center column 130, and any suitable number of outlet pipes 160 may be included with the separation tank 100.

Because oil is lighter than water, oil which has separated from the helical flow in the tank interior 104 may rise vertically upwards to the oil region 116 where it can accumulate and float above the water region 118. To collect and remove the recovered oil from the oil region 116, the separation tank 100 can include an oil spillover bucket 162. The oil spillover bucket 162 is an open bucket-like structure that can be disposed around and fixed to the center column 130 axially above the blanking plate 136 generally within the oil region 116. The circular upper edge 164 of the oil spillover bucket 162 is configured as a spillover weir. Recovered oil in the oil region 116 that rises axially above the upper edge 164 can spill over into the oil spillover bucket 162. An oil transport pipe 166 connected to the bottom of the oil spillover bucket 162 can establish fluid communication between the oil spillover bucket and one or more downstream oil storage tanks.

Because sand and other solids entrained in the inflowing mixture are heavier than the oil and other liquids, they may separate out and settle as sedimentation at the bottom portion 108 of the tank interior 104 associated with the sedimentation region 119. To periodically collect and remove the sedimentation collecting on the bottom portion 108, one or more flanged manways 168 may be disposed in the tank sidewall 110 to provide access to the sedimentation region 119. The separation tank 100 may be periodically taken out of service and the sedimentation removed there from. In other embodiments, the separation tank 100 may be operatively associated with an automatic sedimentation removal system disposed within the sedimentation region 119.

To assist in regulating the axial location of the oil region 116 and the aqueous liquid region 118 within the tank shell 102, the separation tank 100 can be operatively associated with one or more water legs 170 that are in fluid communication with the outlet pipes 160 extending from the center column 130 through the tank sidewall 110. Each water leg 170 can be generally coextensive with the vertical height of the separation tank 100 and can include an inside pipe 172 and a coaxial outside pipe 174 having a larger diameter than the inside pipe to provide an annular gap. Furthermore, the inside pipe 172 may be shorter than the outside pipe 174 so that the vertical extension of the inside pipe ends before reaching the top of the water leg 170. The inside pipe 172 may be opened at its upper end and the outside pipe 174 may be enclosed at its upper end. Liquid from the tank interior 104 is directed by the outlet pipes 160 to the annular gap between the inside pipe 172 and outside pipe 174 of the water leg 150 where the liquid flows upwards until it spills over the upper edge and into the inside pipe. Because the tank interior 104 and the water legs 170 are in direct fluid communication, the vertical height of fluid in the respective volumes and the resulting fluid pressure will tend to hydrostatically balance. Thus, the vertical height of the inside pipe 172, which can determine the vertical height of liquid in the annular gap between the inside pipe 172 and the outside pipe 174, controls in part the vertical location of the oil/liquid interface between the oil region 116 and the water region 118 in the tank interior 104. In an embodiment, to further assist in maintaining the hydrostatic pressure between the tank interior 104 and the water legs 170, the water legs can be in gaseous communication with the gas region 114 of the separation tank 100 by a gas line 178 disposed into the upper end of the outside pipe 174. The gas region 114 may also be in gaseous communication with the degassing boot 124 to receive recovered gases therefrom.

INSTALLATION AND OPERATION

The collection and concentration system 50 can be used in connection with an oil collection operation such as a fracking operation and process production fluids removed therefrom. In operation, the incoming aqueous mixture from production, which may include gas, oil, and solid constituents, is received into the separation tank 100 by the inlet 120. By way of example, the separation tank 100 may be about 15.5 in diameter by about 36 feet tall, although in other examples, different sizes are contemplated. The inflowing mixture can be continuously forced to move through the separation tank 100 by hydrostatic pressure from pumps associated with the oil recovery process. The degassing boot equalizer 124, if included, may remove gases dissolved in the inflowing mixture which, because the gases are lighter than the other components of the mixture, will accumulate in the gas region 114 at the top of the tank interior 104 proximate the tank lid 106. The remaining incoming mixture is directed to the downcomer section 132 of the center column 130, as indicated by arrows 200, which will continue to flow downward due to gravity and the fluid backing pressure.

When the inflowing mixture encounters the blanking plate 136, it is redirected to the plurality of distribution arms 140 that extend radially outward and axially downward in the tank interior 104. The mixture flow is therefore directed radially outward and downward as indicated by arrow 202. The distribution arms 140 may be sized to slow the flow of mixture so that remaining gases as well as oils and solids that are entrained or dissolved therein may settle out from the mixture. The tendency of solids to settle from liquids in which they are entrained may be referred to as the lamella effect. When discharged from the distribution arms 140, the downward angle 142 and the orientation of the tangential discharge nozzles 144 directed toward the interior of the tank sidewall 110 imparts a centrifugal or helical motion to the flow of the mixture so that it swirls radially about the central axis 112 as indicated by arrows 204. The mixture flow may make several revolutions around the tank interior 104 and the central axis 112 as the flow descends toward the bottom portion 108 of the tank shell 102. As the mixture enters the large volume of the tank interior 104 and encounters liquid in the liquid region 118 that previously entered the separation tank 100, the velocity of the mixture flow slows. Additionally, friction between the helically directed flow and the tank sidewall 110 may further slow the flow of mixture. The tank sidewall 110 may function as a large coalescence surface causing entrained oil in the mixture to agglomerate and coalesce together and attach as droplets to the tank sidewall 110. Because the oil droplets are lighter than the aqueous solution in which the oil is entrained, the oil may wick up the surface of the tank sidewall 110 till it reaches the oil region 116 where it accumulates and floats above the liquid region 118 as recovered oil. In addition, relative motion between the flow of incoming mixture and the sidewall 110 may cause sand or other solids to settle or precipitate and, because of their heavier weight, fall to and collect at the sediment region 119 proximate the bottom portion 108 of the tank shell 102.

As the flow of mixture axially descends in the separation tank 100, the centrifugal direction, which may be in a counter-clockwise direction, may cause the flow to move towards the center of the tank interior 104 where it encounters the up-flow shroud 152. The up-flow shroud 152 can redirect the flow upwards and substantially parallel with the central axis 112 as indicated by arrows 206. The change in direction of flow caused by the up-flow shroud 152 provides a further opportunity for the heavier sand and solids to settle out of the liquid mixture rather than flow upwards through the liquid region 118. The liquid mixture, now substantially free of gases, oils, and solids and which may primarily be water, can be directed through the orifices 150 disposed in the lower section 134 of the center column 130 and on to the outlet pipes 160. To ensure the flow has spent sufficient separation time in the tank interior 104, the orifices 150 and associated up-flow shroud 152 may be disposed in the lower portion of the liquid region 118. By way of non-limiting example, in a 36 foot tall separation tank 100, the orifices 150 and up-flow shroud 152 may be located in the lower third of the tank interior 104, or approximately ten to twelve feet vertically above the bottom portion 108 of the tank shell 102. The orifices may be 6 inches in diameter.

The recovered water can be used to operate the water legs 170 if included to maintain the axially vertical locations of the gas region 114, oil region 116, and liquid region 118 within the tank interior 104. Recovered water may be directed from the tank interior 104 to the lower portion of the water legs 170 by the outlet pipes 160 as indicated by arrows 208, which discharges recovered water into the annular gaps between the inside pipe 172 and the outside pipe 174. Hydrostatic fluid pressure from the recovered water remaining in the liquid region 118 of the tank interior 104 forces the water in the water leg 170 vertically upwards between the inside and outside pipes 172, 174 as indicate by arrow 210. When the recovered water reaches the upper end of the shorter inside pipe 172, the water will spill over and into the inside pipe 172, as indicated by arrow 212, from where it may be discharged and reused in the associated process.

Because the separation tank 100 and the water legs 170 are both enclosed systems, with the exception of the fluid communication established between them, the hydrostatic fluid pressure between the systems will tend to establish equilibrium, which can be used to maintain the vertical locations of the separation regions. By way of example, the hydrostatic pressure between the liquid in the liquid region 118 and in the water legs 170 will tend to reach equilibrium, such that the vertical extent of the liquid region may be generally determined by the vertical height of the inside pipe 172. Moreover, because the gas region 114 and the upper ends of the water legs 170 are in gaseous communication by the gas lines 178 such that gas can be directed between the water legs 170 and the separation tank 100, the recovered gas may tend to exert a counter pressure or force in the separation tank 100 and water legs 170 further maintaining hydrostatic equilibrium and the vertical locations of the separation regions.

The separation tank 100 may be configured to address temporary surges or overflows of additional inflowing mixture from the associated process. For example, the separation tank 100 and the associated water legs 170 can be sized to treat approximately 30,000 to 105,000 barrels of water per day. By way of non-limiting example, to accommodate such flows, the water leg 170 may be dimensioned such that the inside pipe 172 is 20 inches diameter and the outside pipe 174 is 30 inches in diameter. If additional inflowing mixture is introduced during a surge, it will accumulate in the liquid region 118 raising the oil-water interface 220 between the liquid region and oil region 116. The recovered gases in the gas region 114 may be compressible to accommodate additional inflow of mixture, thus allowing the gas-oil interface 222 to vertically rise toward the tank lid 106 compressing the gas. Vertically raising the oil-water interface 220 also causes the gas-oil interface 222 to rise above the upper edge 164 of the spillover bucket 162 such that recovered oil in the oil region 116 spills over and enters the bucket and can be directed from the separation tank 100 by the oil transportation line 166. When the flow surge terminates, operation of the separation tank 100 can return to normal.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Terms of orientation or direction, such as "vertical" refer to elements as depicted in the figures assuming that the device is installed in a generally upright orientation as shown in FIG. 1.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A collection and concentration system, comprising:
    a separation tank including a tank shell having a closed tank lid, a bottom portion, and a tank sidewall defining a central axis and a tank interior, the tank interior having a gas region, an oil region, a liquid region, and a sediment region;
    a center column vertically arranged in the tank interior and aligned with respect to the central axis, the center column fluidly separated by a blanking plate into a downcomer section in fluid communication with an inlet for receiving an inflowing mixture and a lower section in fluid communication with an outlet pipe for discharging a recovered liquid; and
    a plurality of distribution arms in fluid communication with the downcomer section of the center column below the inlet and above the blanking plate, the plurality of distribution arm extending radially toward an interior of the tank sidewall and angled partially axially downward from the center column toward the tank sidewall.

2. The collection and concentration system of claim 1, wherein each of the distribution arms includes a tangential discharge nozzle proximate to and directed tangentially at the interior of the tank sidewall.

3. The collection and concentration system of claim 1, wherein the plurality of distribution arms fluidly communicate with the downcomer section axially adjacently above the blanking plate.

4. The collection and concentration system of claim 2, wherein each of the distribution arms includes an elbow to direct the tangential discharge nozzle tangentially toward the interior of the tank sidewall.

5. The collection and concentration system of claim 1, wherein the lower section includes a plurality of orifices for receiving the recovered liquid into the center column.

6. The collection and concentration system of claim 5, further comprising an up-flow shroud disposed around the lower section of the center column generally coextensive with the plurality of orifices.

7. The collection and concentration system of claim 6, wherein the up-flow shroud includes a cylindrical jacket coaxially disposed about the lower section and a connection plate secured around the lower section perpendicular to the central axis.

8. The collection and concentration system of claim 1, further comprising an oil spillover bucket disposed around the downcomer section of the center column, the oil spillover bucket in fluid communication with an oil storage tank.

9. The collection and concentration system of claim 8, wherein the oil spillover bucket includes an upper edge configured as a spillover weir for receiving oil from the oil region that rises above the upper edge.

10. The collection and concentration system of claim 1, further comprising at least one water leg in fluid communication with the outlet pipe for maintaining an axial position of the oil region and an axial position of the liquid region in the tank interior.

11. The collection and concentration system of claim 10, wherein the water leg includes an inside pipe and an outside pipe disposed coaxially around the inside pipe, the inside pipe being shorter in length than the outside pipe.

12. The collection and concentration system of claim 1, further comprising a degassing boot operatively associated with the inlet for degassing inflowing mixture.

13. A method of separating constituents from an inflowing mixture comprising:
    directing the inflowing mixture axially downwardly in a downcomer section of a center column vertically disposed within a separation tank;
    radially redirecting the inflowing mixture to a plurality of distribution arms in fluid communication below an inlet and above a blanking plate of the center column and extending radially outward and angled partially axially downward from the downcomer section toward a tank sidewall of the separation tank;
    tangentially discharging the inflowing mixture tangentially against the tank sidewall to induce a helical, axially downward flow to the inflowing mixture;
    collecting and redirecting the inflowing mixture upwards with an up-flow shroud disposed around a lower section of the center column;
    directing a recovered liquid into the lower section of the center column; and
    discharging the recovered liquid from the separation tank via an outlet pipe in fluid communication with the lower section of the center column.

14. The method of claim 13, wherein recovered oil accumulates in an oil region disposed axially towards a lid of the separation tank, sediment accumulates in a sediment region disposed axially towards a bottom portion of the separation tank; and recovered liquid accumulates in a liquid region disposed between the oil region and the sediment region.

15. The method of claim 14, further comprising receiving recovered oil in an oil spillover bucket disposed in the oil region of the separation tank.

16. The method of claim 15, further comprising degassing the inflowing mixture entering the downcomer section, and recovering gases collecting in a gas region disposed axially above the oil region.

17. The method of claim 16, further comprising maintaining axial locations of the oil region and the liquid region with a water leg in fluid communication with the outlet pipe.

18. A separation tank for gravity separation of constituents from an inflowing mixture, the separation tank comprising:
    a tank shell defining a tank interior having a gas region, an oil region vertically below the gas region, a liquid region vertically below the oil region, and a sediment region vertically below the liquid region;
    a center column disposed in the tank interior, the center column separated by a blanking plate into a downcomer section in fluid communication with an inlet to receive the inflowing mixture and a lower section in fluid communication with an outlet pipe to discharge a recovered liquid;
    a plurality of distribution arms in fluid communication with the downcomer section below the inlet and above the blanking plate and directed outward at a partially axially downward angle toward the tank shell, the plurality of distribution arms disposed within and angled vertically downward within the liquid region; and
    an oil spillover bucket disposed within and recovering oil from the oil region; and
    a plurality of orifices disposed in the lower section within the liquid region to receive and direct the recovered liquid to the outlet pipe.

19. The separation tank of claim 18, wherein each of the plurality of distribution arms terminate proximate the tank shell and include a tangential discharge nozzle oriented to direct inflowing mixture tangentially against an interior of the tank shell.

20. The separation tank of claim 18, further comprising an up-flow shroud disposed about the lower section coextensive with the plurality of orifices to direct the recovered liquid from the liquid region to the plurality of orifices.

* * * * *